United States Patent [19]

Malmberg et al.

[11] 4,047,033

[45] Sept. 6, 1977

[54] CHECKING AN IDENTITY, AUTHORITY OR CHECK DOCUMENT OR THE LIKE

[75] Inventors: Thor Anders Helge Malmberg, Stockholm; Knut Göran Högberg, Hasselby; Stig Roland Sjöquist, Vallentuna, all of Sweden

[73] Assignee: AB ID-Kort, Stockholm, Sweden

[21] Appl. No.: 624,473

[22] Filed: Oct. 21, 1975

[30] Foreign Application Priority Data

Oct. 25, 1974 Sweden ............................... 7413480

[51] Int. Cl.² ............................................... G01J 1/00
[52] U.S. Cl. .................................... 250/341; 250/330; 250/338; 250/458
[58] Field of Search ............... 250/338, 339, 340, 365, 250/461, 271, 459, 486, 331, 330, 341, 458

[56] References Cited

U.S. PATENT DOCUMENTS

| | | | |
|---|---|---|---|
| 3,070,698 | 12/1962 | Bloembergen | 250/459 |
| 3,105,908 | 4/1965 | Burkhardt et al. | 250/461 |
| 3,452,332 | 6/1969 | Bron et al. | 250/271 |
| 3,473,027 | 10/1969 | Freeman et al. | 250/365 |
| 3,539,941 | 11/1970 | Halverson | 250/461 |
| 3,564,215 | 2/1971 | Peoples | 250/271 |
| 3,586,640 | 6/1971 | Pershan | 250/330 |
| 3,654,463 | 4/1972 | Geusic | 250/486 |
| 3,663,813 | 5/1972 | Shaw | 250/365 |
| 3,764,807 | 10/1973 | Pollack | 250/330 |
| 3,793,527 | 2/1974 | Forest | 250/461 |
| 3,958,970 | 5/1976 | Auzel et al. | 250/487 |

OTHER PUBLICATIONS

Efficient Green-Emitting IR Phosphors by Kano et al., Electro Chemical Society vol. 119 No. 11 Nov. 1972 pp. 1561-1564.

Primary Examiner—Harold A. Dixon
Attorney, Agent, or Firm—Burns, Doane, Swecker & Mathis

[57] ABSTRACT

A document such as an ID-card is provided with check markings comprising a material based upon rare earth metals and having the property that when excited by IR radiation it emits visible light. When checking the document, the document is irradiated with pulsed IR radiation, the occurrence of corresponding visible light pulses originating from said material being detected. The visible light pulses have well defined rise and decay times dictated by the check material used, which fact is used to check that output pulses from the detector are the correct ones for indicating the genuiness of the document.

28 Claims, 7 Drawing Figures

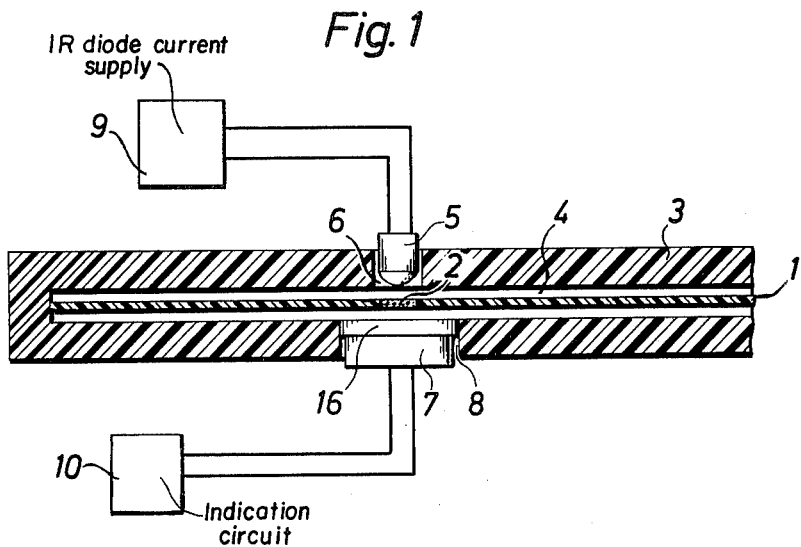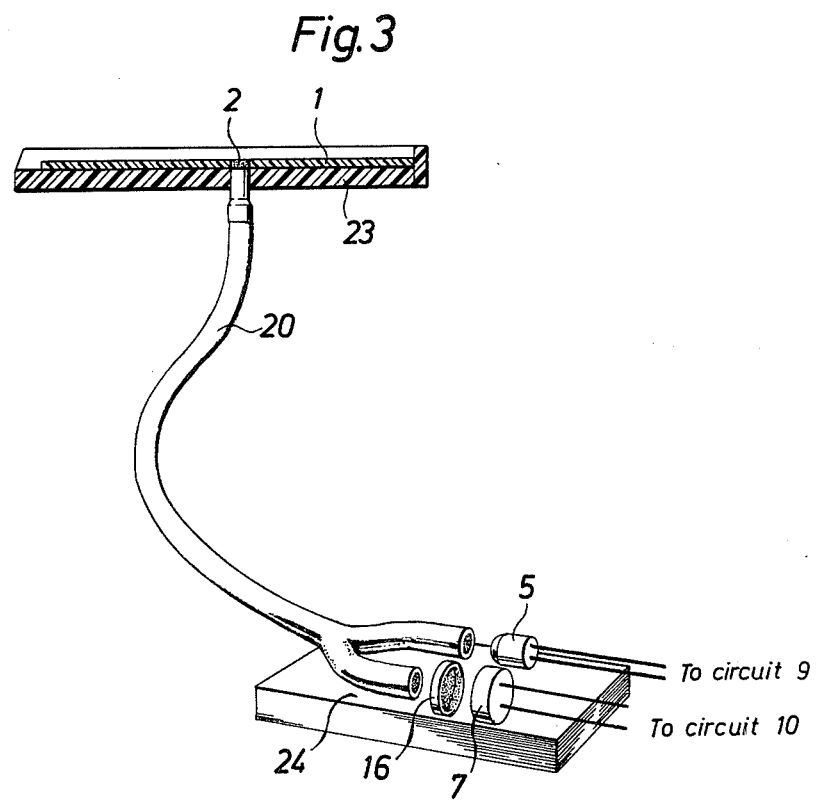

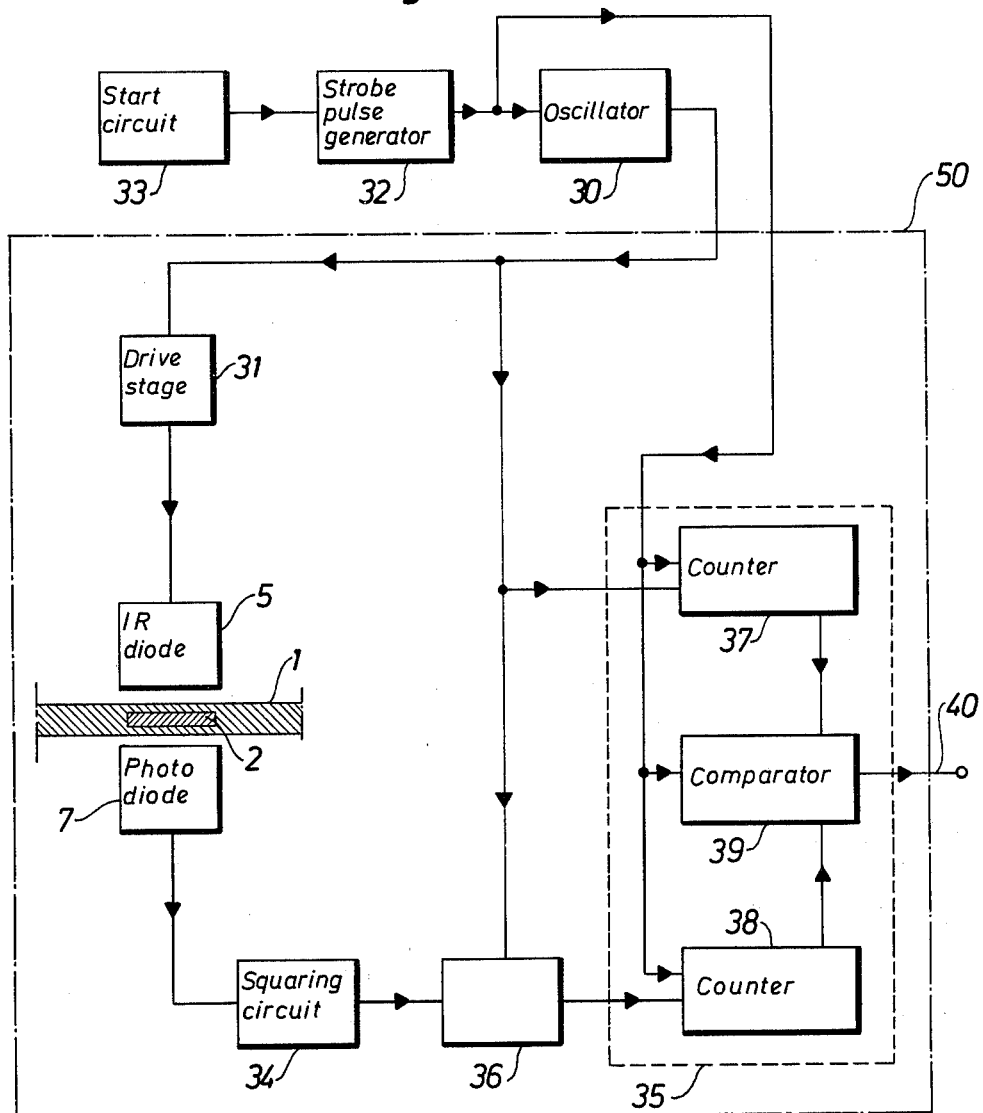

CHECKING AN IDENTITY, AUTHORITY OR CHECK DOCUMENT OR THE LIKE

The present invention relates to the checking of an identity, authority or check paper or document or the like. The invention is particularly suitable for the checking of so-called ID-cards but the expression "document" as used here is intended to cover a very wide scope. Thus the invention is also suitable for the checking of documents such as account cards, bank cash cards, bank-notes, cheques, passports, deeds and data tapes in data-processing centers.

A whole range of different solutions to the problem of checking the genuineness of a document have been proposed, such as marking with radioactive isotopes, marking with non-radioactive tracer substances which under neutron irradiation partially absorb the radiation, and marking with UV-fluorescing substances. All these proposed solutions are accompanied by considerable drawbacks.

The two first mentioned proposals have the advantage, of course, that substances are being used which are difficult to obtain with the view of forging, but which at the same time suffer from the major drawback that radioactive radiation is being used, this on the one hand being subject to stringent regulations and on the other hand creating considerable apprehension in a large proportion of the people who might come in contact therewith.

The proposed solutions using UV-fluoriescence have amongst others the following drawbacks:

UV-fluorescing substances are relatively easy to acquire for a forger; the requisite UV light source requires a high voltage and is difficult to coordinate with modern electronic components; the UV light source is difficult to modulate. Because of these special conditions pertaining to the UV light source, it is difficult to automate the check process.

Accordingly, there is a clear need for a new method of checking documents, which does not show the drawbacks referred to earlier but is fully acceptable to the people concerned, has a high degree of security against falsification, is readily adaptable to modern electronic systems and therefore to modern readers for the documents in question, and can easily be automated. This need is fulfilled by the present invention.

The invention is based upon the marking of the document which is to be checked, with a material based upon rare earth metals, which possesses a capability in accordance with which, on excitation with radiation of longer wavelength, preferably infra-red radiation, it emits radiation of shorter wavelength, in particular visible light, especially green light; in other words, on excitation with photons of a given energy it emits photons of a specific higher energy, that is to say in contrast to what happens in normal fluorescence.

This characteristic is surprising in view of the suggestions of the quantum mechanics. When checking the document, the document is irradiated by the longer wave radiation and the presence of the consequent shorter wave radiation is detected.

The method in accordance with the invention offers a series of advantages. The material used is difficult to manufacture, expensive and has only a few fields of application, that is to say it is extremely difficult to acquire with a view to forge. Furthermore, it is a simple matter using modern electronic components, both to generate the excitatory infra-red radiation with a suitable well-defined wave length, for example using light emitting diodes, and to selectively detect visible light emitted as a consequence of the IR excitation, for example using photo-diodes. Light emitting diodes require only a low voltage and can readily be modulated, and, like photo-diodes are extremely small and readily incorporable into modern electronic equipment for reading for example coded ID-cards. Furthermore, IR radiation has a good penetrative power which enables simple excitation from one side of the document being checked and detection at the other side, even in the cases where the ceck material is applied at said other side. With pulse-type IR excitation, furthermore, the emitted light pulses exhibit in respect of each specific check material, (irrespective of the concentration thereof) well defined rise and decay times which makes it possible with a high degree of reliability to differentiate between check materials or alternatively to ascertain whether a received light pulse actually comes from the correct material. Finally, materials of the kind intended here, have shown themselves to be highly stable and resistant to influences of the kind which the document can be subjected to during manufacture and normal use.

In accordance with one aspect of the invention, thus an identity, authority or check document or the like is provided, which is characterized in that it is provided with a marking comprising a material based on rare earth metals, said material having the capability, when excited by longer wave radiation, preferably infra-red radiation, to emit shorter wave radiation, in particular visible light. The material is suitably of the green-emitting types Na Ln $F_4$: $Yb^{3+}$, $Er^{3+}$(Ln: Y, Gd, La) or Y $F_3$: $Yb^{3+}$, $Er^{3+}$. The material $NaY_{0.57}Yb_{0.39}Er_{0.04}F_4$ has been found to be particularly advantageous. The material will suitably be applied in the form of a crystalline powder.

In accordance with another aspect of the invention, a method of marking and checking an identity, authority or check document or the like, is provided, which method is characterized in that at the marking the document is provided with a material based upon rare earth metals and having the capability, when excited by longer wave radiation, preverably infra-red radiation, to emit shorter wave radiation, in particular visible light; and in that at the checking at least parts of the document which carry said material are irradiated by said longer wave radiation and the occurrence of resultant shorter wave radiation is detected.

The method which is chosen to apply the material depends generally upon what type of document is involved. The effort is towards applying the material in such a fashion that it is protected against mechanical influences and that it is as difficult as possible to extract it in order to use it for forgery.

Considering for instance photographically produced ID-cards, a good method is to slurry the material in a suitable binder and thereafter to apply the slurry to the ID card at that stage in its manufacture at which the photographic emulsion is still unprotected. Application can conveniently be performed by screen-printing. By using different screens, the field or fields on the card, which contains or contain the relevant material, can be given different shapes and positions, i.e., individual coding of cards is possible. When the material has been applied in this way, it is protected by applying a sealing coating to the ID card in the normal way.

Another method of application is to incorporate the material in a special carrier, for example in the form of a very thin plastic strip. The carrier is thereafter introduced into the base material, for example paper or plastic of which the document is to be made.

At the time of checking of a document, the irradiation will preferably be pulsed so that the detected radiation is also bound to be pulsed at certain instants corresponding to the instants at which irradiation is carried out. It is advantageous in this context to check that the rise and decay times of the detected radiation pulses, correspond with the specific rise and decay times applying to the material which has been applied to the document being checked.

The checking of a document can be performed dynamically or statically. It is advantageous to irradiate the document sequentially or simultaneously at specific points or areas, and, after detection of from which points or areas shorter wave radiation, caused by the irradiation, is obtained, to compare the information thus obtained as to the irradiated points or areas with information stemming from another source and indicating from which points or areas such detected short-wave radiation should be obtained. The information obtained elsewhere can be so obtained by means of other information obtained from another simultaneous reading of the document (for example using an algorithm or from a dataprocessing centre), or may be fixed for the apparatus in which document checking is being carried out.

In accordance with another aspect of the invention, an apparatus is provided for checking a document as described hereinbefore, which apparatus is characterized in that it comprises one or more elements for generating longer wave radiation, a corresponding number of elements for detecting shorter wave radiation, each radiation-generating element being assigned to a specific radiation-detecting element, and means for placing the document and the said radiation-generating and radiation-detecting elements in a specific, predetermined check position relatively to one another. The radiation-generating elements will conveniently be constituted by IR light emitting diodes which are designed to emit the majority of their radiation energy within a limited wavelength range which is matched to the check material to be excited. The radiation-detecting elements will conveniently be constituted by photodiodes which are arranged or chosen in order to detect radiation largely exclusively within a narrow wavelength range determined by the shorter wave radiation which can be expected from the check material being used.

The invention will be described in more detail hereinafter by way of examples of embodiments of an apparatus for checking a document in accordance with the invention, with reference being made to the attached drawings.

FIG. 1 schematically illustrates a simple apparatus in accordance with the invention for checking document.

FIG. 3 illustrates, again schematically, another simple apparatus in accordance with the invention for checking a document.

FIG. 4 shows a block diagram of an apparatus in accordance with the invention for checking a document statically, which apparatus operates using pulsed irradiation of the document.

In the different Figures, identical or corresponding elements have been given identical reference numerals.

Figure 2:
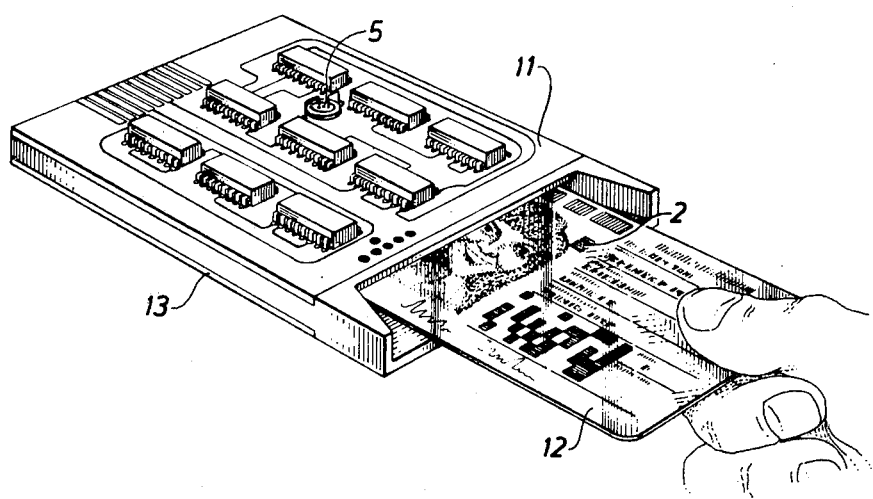
FIG. 2 illustrates how an arrangement in accordance with FIG. 1 can be used in connection with a known ID-card reader.

FIG. 1 schematically illustrates a simple apparatus for checking a card-like document 1 which is provided with a check marking in the form of an area 2 located at a specific position and made of a check material emitting green light, in accordance with the invention. The apparatus comprises a structure 3 with a slot 4 into which document 1 is designed to be inserted. In the upper part, delimiting the slot, of the structure 3 a light emitting diode 5 emitting in the infra-red is located in a hole 6. In the bottom part, delimiting the slot, of structure 3 there is located centrally opposite light emitting diode 5 a filter 16 which blocks IR radiation, and a photo-diode 7 sensitive to green light, arranged in a hole 8. The light emitting diode 5 and the filter-equipped photo-diode 7 are so disposed that area 2 is located between them when document 1 is properly inserted into slot 4.

The light emitting diode 5 is connected to a circuit 9 which supplies current to it. The photo-diode 7 is connected to an indicating circuit 10 which is designed to indicate when photo-diode 7 is producing an output signal.

When document 1 is to be checked, it is pushed fully into slot 4 whereupon light emitting diode 5 is energized. The diode then emits IR radiation which affects the check material 2, if included in the document, so that it emits green light. The green light is picked up by photo-diode 7 which consequently produces an output signal to circuit 10. This latter then indicates that the document checked is genuine.

If the document being checked does not contain check material of the kind which, under IR excitation, emits green light of the correct wavelength, then the photo-diode will not produce any output signal and circuit 10 will consequently indicate that the document is not genuine or correct.

Referring now to FIG. 2, this figure illustrates how the invention can be used in connection with a known ID-card reader, while using an arrangement in accordance with FIG. 1. The ID-card reader advantageously is of the type disclosed in the U.S. patent application Ser. No. 528,570 filed on Nov. 30, 1974 now U.S. Pat. No. 3,976,857 and assigned to the same assignee as the present invention. The disclosure of this patent application is hereby incorporated by reference. As shown in FIG. 2, light emitting diode 5 can be inserted in an upper printed circuit board 11, the location of light emitting diode 5 corresponding to the location of the area 2 on the ID-card 12, which contains check material. The photo-diode 7 (not shown) can be inserted correspondingly in a lower printed circuit board 13, said circuit board 13 also accommodating requisite electronic circuits (not shown) if not available on printed circuit board 11.

FIG. 3 schematically illustrates an alternative arrangement for checking a document 1 having an area 2 of check material, in which IR-emitting diode 5 and cooperating photo-diode 7 are arranged at the same side of the document which is to be checked. This arrangement includes a flexible mixed fibre optics 20 one end of which is arranged in a plate 23 for supporting the document 1 to be checked, and the other end of which is arranged on a plate or board 24 and is split so that a first number of the fibres in the fibre optics are connected to light emitting diode 5 and a second number of the fibres are connected to filter 16 and photo-diode 7, said diode 5, filter 16 and photo-diode 7 also being carried by plate 24. As is well known, fiber optics including a light emitting diode, a filter and a photo diode mounted in a housing is readily available on the market and, therefore, should need no further description.

The IR radiation can thus be conducted down through the first number of fibres to document 1 where it excites the check material 2, while visible light emitted from excited check material can be conducted up to photo-diode 7 through the second number of fibres in the fibre optics. The light emitting diode 5 and photo-diode 7 can be connected to circuits corresponding to those shown in FIG. 1.

The arrangement of FIG. 3 has the advantage that it enables simple checking of documents which cannot be inserted between a light emitting diode and a photo-diode in the manner shown in FIG. 1. However, an arrangement according to FIG. 3 can also be used in connection with an ID-card reader, for instance, which cannot be modified as illustrated in FIG. 2. In such a case, said one end of the fibre optics 20 is arranged in a hole in one of the printed boards or plates between which the ID-card is to be inserted, the other end of the fibre optics including diodes 5 and 7 and filter 16 being arranged on a separate printed circuit board together with requisite electronic circuits. Due to the flexible fibre optics this separate printed circuit board can be stacked with the ID-card reader, while being suitably spaced therefrom, or located at the side thereof.

In FIG. 4 there is shown a block diagram of a more sophisticated apparatus in accordance with the invention, for a static check of a document 1 provided with an area 2 of check material. The apparatus, as before, comprises an IR-emitting diode 5 and a cooperating photo-diode 7 which, as illustrated, are arranged to receive between each other the document 1 which is to be examined, in such a way that the area 2 on genuine documents comes to be positioned between light emitting diode 5 and photo-diode 7. The light emitting diode 5 is arranged for pulsed operation by means of an oscillator 30 and a drive stage 31. The oscillator 30 is designed to emit a series of control pulses when it receives a strobe pulse from a strobe pulse generator 32. The strobe pulse generator 32 is in turn designed to emit the strobe pulse when it receives an input signal from a circuit 33 which is activated when document 1 is in the correct check position, for example when the document has been correctly inserted into a slot as shown in FIG. 1.

The photo-diode 7, which under the correct conditions consequently will emit output pulses corresponding to the oscillator pulses, has its output connected to a circuit 34 having an amplifying and square pulse shaping function, the output of which circuit 34 is connected to a first check circuit 35 via a circuit 36 which checks that the pulses obtained from photo-diode 7 have rise and decay times which fall within predetermined limits. The circuit 36 is also supplied with control pulses from oscillator 30.

The function of circuit 36 is thus to block any output pulse from circuit 34, whose rise and decay times do not correspond with the ones specified in respect of the check material 2 used. This function is performed by exploiting the fact that each squared output pulse from circuit 34 due to a certain delay of the output pulse from photo-diode 7 and the special rise and decay times of said last-mentioned output pulse as dictated by the check material used, will be delayed by a certain time in relation to the triggering control pulse and will have a specific duration. The circuit 36 is consequently designed so that, when it has received a control pulse from oscillator 30, with a given time delay it opens a "window" for a very short time interval, so that a pulse can pass from circuit 34 to check circuit 35. If the output pulse from circuit 34 is not the correct one, for example due to field 2 containing the wrong check material, then said window opens at a time such that there is no pulse present to pass through to check circuit 35.

One embodiment of circuit 36 will be described in more detail later while referring to FIGS. 6 and 7.

The check circuit 35 comprises a first counter 37, a second counter 38 and a comparator 39. The first counter 37 is arranged to count the number of control pulses supplied by the oscillator and the second counter 38 is arranged to count the number of pulses which are passed through circuit 36. The counters have the same numbers of stages and comparator 39 is arranged to compare the contents of the last stages of the registers. The counters 37, 38 and comparator 39 are arranged to be reset to zero and cleared by each strobe pulse furnished by strobe pulse generator 32.

The function of the apparatus according to FIG. 4 is as follows:

When the document 1 has been brought into the proper check position relatively to the light emitting diode 5 and photo-diode 7, circuit 33 is actuated, this circuit for example containing a limit switch, and supplies a start pulse to strobe pulse generator 32. The latter responds by producing a strobe pulse of predetermined duration. The strobe pulse clears counters 37, 38 and comparator 39 for a check operation and releases oscillator 30 which consequently begins to emit a predetermined number of control pulses. Each control pulse acts through the drive stage 31 to pulse light emitting diode 5 which consequently emits an IR pulse to the check material 2. The latter is consequently excited and emits a corresponding pulse of visible light which is detected by photo-diode 7. The slightly time delayed corresponding output pulse from photo-diode 7 is amplified and given a squarewave form in circuit 34, and is then applied to circuit 36. The latter will somewhat earlier have received the corresponding control pulse, and guided thereof, will have determined the time of a window through which a correct output pulse from circuit 34 can pass to form an input pulse to counter 38. Said control pulse also has been applied to counter 37 which consequently, under normal conditions, will always count a control pulse slightly before the second counter 38 counts a corresponding input pulse.

When a predetermined number of control pulses have been emitted by oscillator 30, the strobe pulse from strobe pulse generator 32 ceases whereby oscillator 30 is blocked and the supply of control pulses ceases. When the last control pulse has been counted by counter 37, the last stage of the latter is activated and a pulse is emitted to comparator 39. Provided that the last stage of counter 38, too, is then activated within a predetermined time interval, for example equivalent to half a control pulse period, and emits a pulse to comparator 39, the comparator will produce an output pulse on line 40, indicating that the check has shown document 1 to be genuine, i.e. each control pulse which has pulsed light emitting diode 5 has given rise to a correct output pulse from photo-diode 7.

The apparatus according to FIG. 4 can radily be supplemented to check a document having several check areas. This is most readily done by contriving that in respect of each check area the apparatus comprises the circuits which are enclosed by dot-and-dash lines 50. However, other modifications are obvious. Thus, the check areas can be checked sequentially using the same circuits 30–32 and 34–39, and appropriate switching and control circuits. If the apparatus in accordance with FIG. 4 is modified to check several areas of which for example one or some should not contain the check material, then it is advantageous to contrieve that the apparatus contains additional comparator circuits in the manner described hereinafter in association with FIG. 4.

Figure 5:
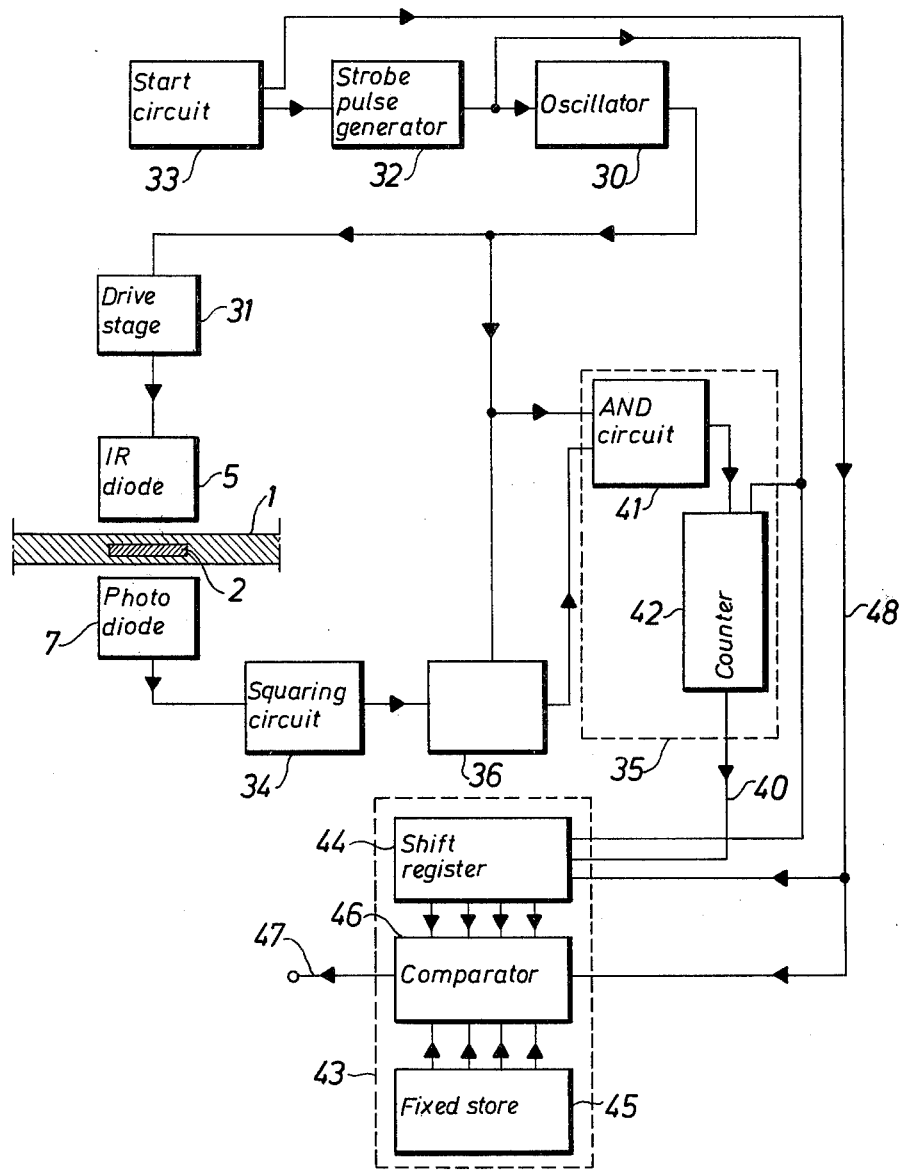
FIG. 5 shows a block diagram of a preferred apparatus in accordance with the invention for dynamic document checking, which apparatus operates using pulsed irradiation of predetermined points on the document and with comparison of the point check results obtained with predetermined check information.

The apparatus according to FIG. 5 is designed to effect dynamic checking of a document 1 in four predetermined check areas, one or more of which may contain check material 2 in accordance with a specific code. The apparatus has substantially the same basic designs as that of FIG. 4, that is to say each check area is checked substantially in the same way as in the apparatus of FIG. 4, although dynamically instead of statically.

The apparatus in accordance with FIG. 5 differs from that of FIG. 4, however, in the following respects:

The circuit 33 is designed on the one hand to produce a start pulse when the document 1 is inserted into the apparatus, and on the other hand to supply a pulse to strobe pulse generator 32 in respect of each check position which is reached whilst the document 1 is being fed through the check apparatus. The circuit, in the present example, therefore, sequentially produces four time-separated pulses, each of which indicates that the corresponding check area is located between light emitting diode 5 and photo-diode 7. Each such pulse thus, as before, triggers checking of the corresponding check area on the document.

Furthermore, check circuit 35 is differently designed although it is also based upon pulse counting. The check circuit 35 accordingly contains an AND-circuit 41 one input of which receives the control pulses from oscillator 30 and the other input of which receives the output pulses from circuit 36, its output producing a pulse each time a received control pulse is followed within a specific time interval by a corresponding pulse from circuit 36. The AND-circuit 41 has its output connected to a counter 42 which is cleared by each strobe pulse from strobe pulse generator 32 and produces an output pulse on line 40 when it has received a predetermined number of pulses from AND-circuit 41. An output pulse on line 40 represents a logic 1 condition and indicates that the checked area on document 1 is correctly provided with check material. Correspondingly, the absence of an output pulse on line 40 represents a logic 0 condition indicating that the checked area on document 1 is not provided with check material or alternatively is incorrectly provided with check material. The duration of each strobe pulse and the frequency of oscillator 30 are so chosen that each check area on document 1, even at the maximum speed of feed of the document in the apparatus, is between light emitting diode 5 and photo-diode 7 for a time such that a sufficient number of pulses can be fed into counter 42 if the check area carries check material in accordance with the invention.

Finally, the apparatus in accordance with FIG. 5 has a comparator circuit 43 comprising a store 44 with a number of storage positions corresponding to the number of check areas on the document, in the present example this is a four-stage shift register, a fixed store 45 with a like number of positions and a comparator 46 arranged to produce a signal at its output 47 when the contents of stores 44 and 45 are found to coincide on comparison. The shift-register 44 and the comparator 46 are designed to be reset to zero and cleared by the start pulse from circuit 33, via line 48. The shifting of logic ones and zeroes into shift register 44 from check circuit 35, is controlled by strobe pulses from strobe pulse generator 32.

The apparatus according to FIG. 5 thus operates in the following manner: When document 1 to be checked is introduced into the apparatus, circuit 33 is activated and transmits a start pulse on line 48, so that shift register 44 and comparator 46 acquire the zero starting position. When the document, as feed through the apparatus continues, reaches its first check position, i.e., with its first check area between light emitting diode 5 and photo-diode 7, circuit 33 emits a first pulse to strobe pulse generator 32 which in turn supplies a first strobe pulse to zero counter 44 and to release or trigger oscillator 30. The oscillator then emits a first series of control pulses which, as in the apparatus according to FIG. 4, give rise to a corresponding series of output pulses from circuit 36 because the first check area is assumed to be provided with correct check material 2. The two series of pulses are supplied to AND-circuit 41 and give rise to a series of pulses which are counted into counter 42. When a suitable, predetermined number of pulses have been counted by counter 42, the latter supplies an output signal representing logic 1 condition. When the first strobe pulse ceases, oscillator 30 is blocked again and the check result on line 40, in this case a logic 1, is shifted into the first stage of shift register 44. This completes the first check operation.

The document feed can meanwhile have continued uninterruptedly, but it is assumed that at the cessation of the first strobe pulse the document has been fed at most such that the first check area can still be regarded as being located between light emitting diode 5 and photo-diode 7.

When the document feed has continued, so that document 1 is in its second check position, that is to say with its second check area located between light emitting diode 5 and photo-diode 7, circuit 33 supplies a second pulse to strobe pulse generator 32, thereby triggering a second check operation. In the same way, a third and fourth check operation are also triggered.

When the fourth check operation has been completed, with the shifting of a logic 1 or 0 into shift register 44, the latter then contains a four-bit binary word which is now automatically transferred to comparator 46. The comparator compares said binary word with a four-bit binary check word which is obtained from store 45. If the comparison shows coincidence between the two binary words, then comparator 46 supplies an accept signal through line 47, indicating that the checked document is genuine.

Figure 6:
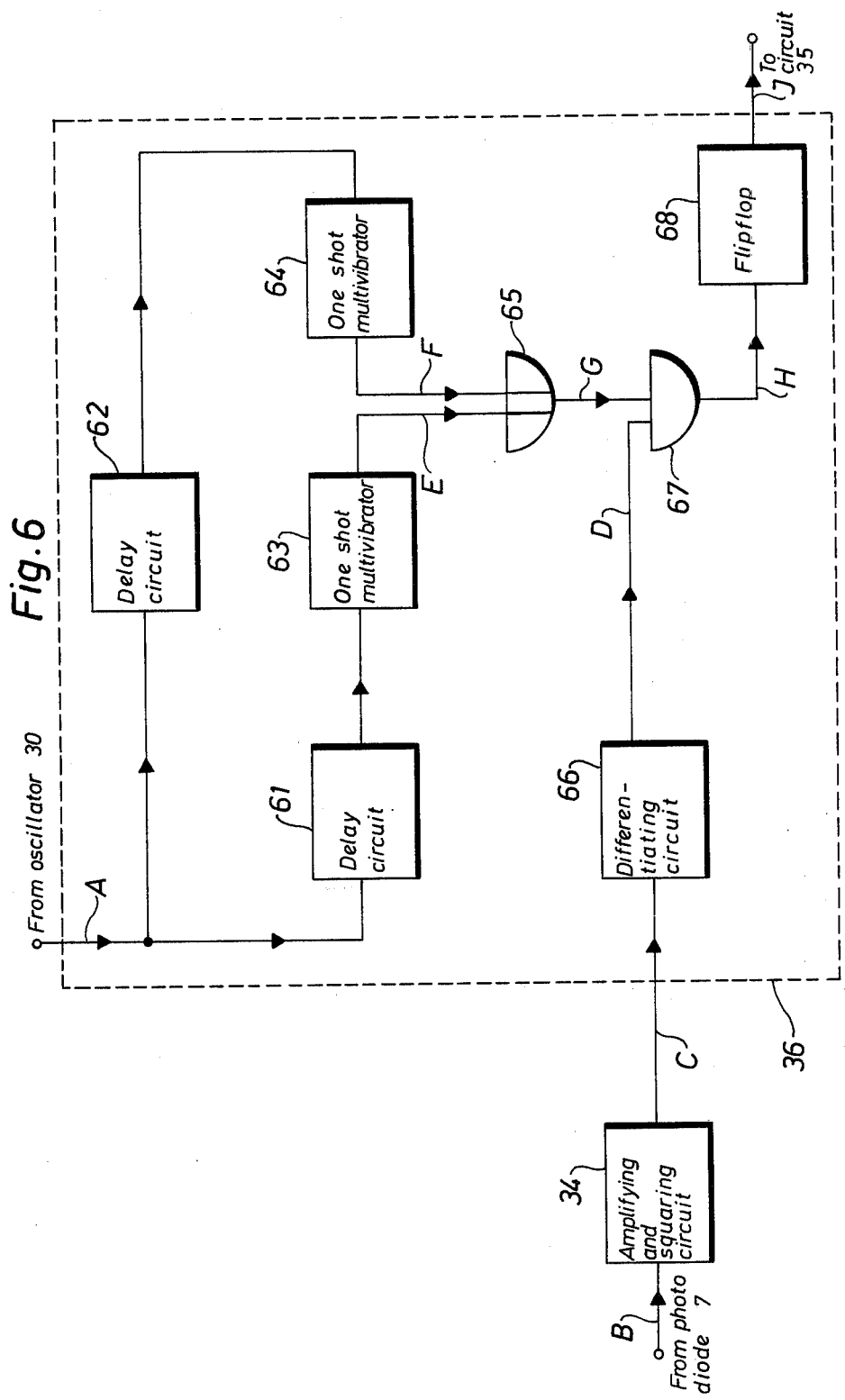
FIG. 6 shows a block diagram of one embodiment of a check circuit used in the apparatuses of FIGS. 4 and 5.
Figure 7:
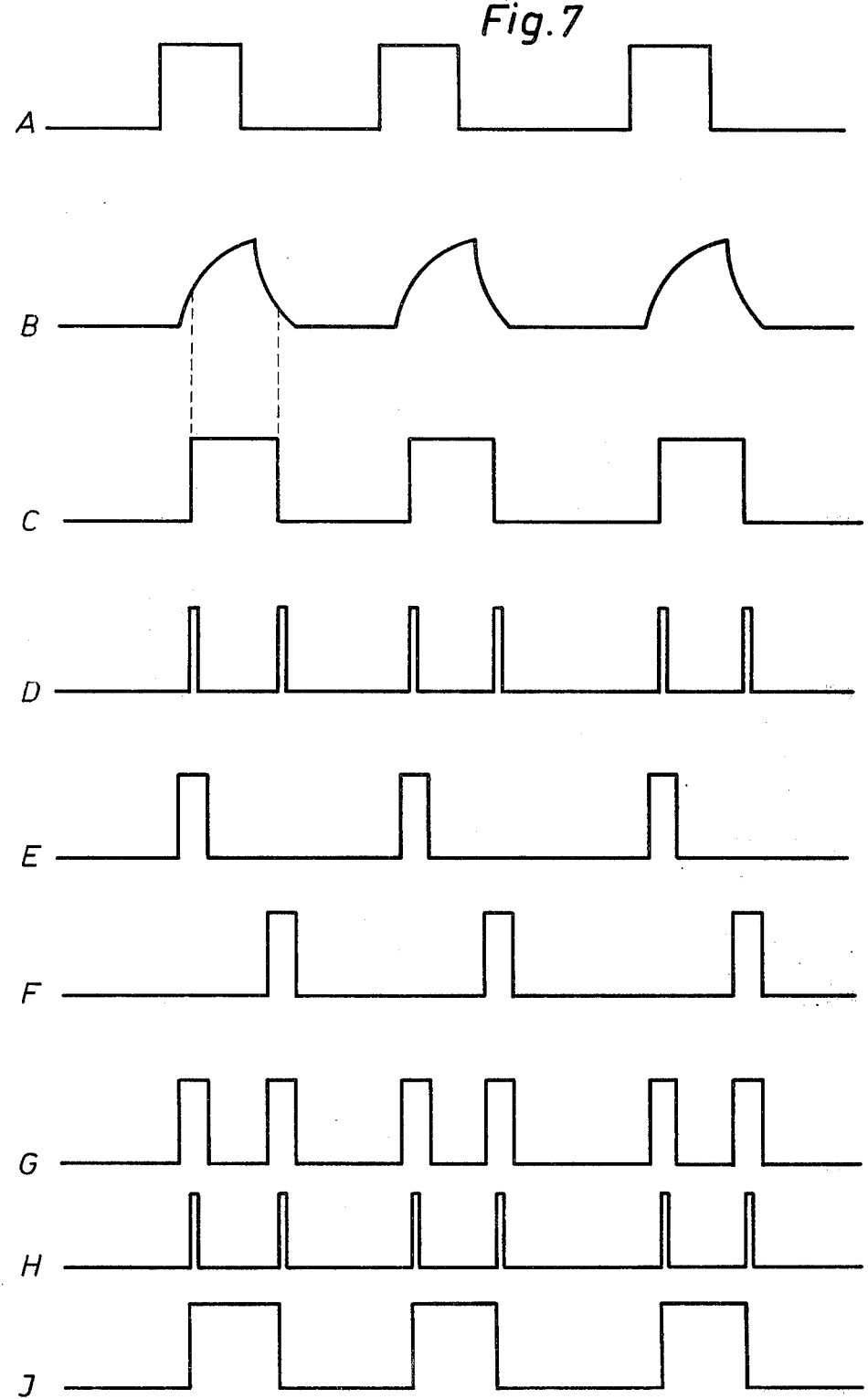
FIG. 7 is a timing chart explaining the operation of the check circuit of FIG. 6.

Referring now to FIGS. 6 and 7, one embodiment of a check circuit 36 will be described.

The check circuit includes a first and a second delay circuit 61 and 62, respectively, a first and a second one shot multivibrator 63 and 64, respectively, an OR-gate 65, a differentiating circuit 66, and AND-gate 67 and a flip-flop 68. The inputs of said first and second delay circuits 61 and 62 are connected to the output of oscillator 30 to receive the control pulses emitted by oscillator 30. The output of the first delay circuit 61 is connected to the input of the first one shot multivibrator 63, and the output of the second delay circuit 62 is connected to the input of the second one shot multivibrator 64. Each of the outputs of one shot multivibrators 63 and 64 is connected to a corresponding one of the two inputs of OR-gate 65. The output of OR-gate 65 is connected to one input of AND-gate 67, the other input of which is connected to the output of differentiating circuit 66. The input of differentiating circuit 66 is connected to the output of circuit 34. Finally, the output of AND-gate 67 is connected to the input of flip-flop 68, the output of which is connected to the input of circuit 35.

The waveforms of the signals at various points A – J of FIG. 6 are depicted in FIG. 7, waveform A of FIG. 7 corresponding to point A of FIG. 6 and so forth.

The operation of the check circuit illustrated in FIGS. 6 and 7 should be evident for those skilled in art and, therefore, need no detailed explanation. However, the following description may be useful in understanding the operation of the check circuit.

The output pulses (B) from photo-diode 7 pass amplifying and squaring circuit 34, whereby the leading and trailing edges of the squared pulses (C) will be delayed relative to the leading edge of the control pulses (A) from oscillator 30 in a manner which, for a certain amplitude, is characteristic of the specific rise and decay times, respectively, of the output pulses (B) as dictated by the check material used.

Each control pulse from oscillator 30 passes through both delay circuit 61 and delay circuit 62 to trigger one shot multivibrators 63 and 64, respectively, at different times corresponding to the leading and the trailing edges, respectively, of the corresponding output pulse from circuit 34. The triggered output pulses of one shot multivibrators 63 and 64 each have a selected duration to establish window control pulses for the leading and trailing edges, respectively, of the corresponding squared pulse from circuit 34.

Thus, the delay time of delay circuit 61 and the pulse duration of the triggered output pulse of one shot multivibrator 63 are chosen to give a first predetermined window pulse enabling AND-gate 67 to let the leading edge of a corresponding squared pulse pass to trig flip-flop 68, if said squared pulse originates from a check material giving correct rise time.

Analogously, the delay time of delay circuit 62 and the pulse duration of the triggered output pulse of one shot multivibrator 64 are chosen to give a second predetermined window pulse enabling AND-gate 67 to let the trailing edge of a corresponding squared pulse pass to trigger flip-flop 68, if said squared pulse originates from a check material giving correct decay time.

Of course, the first and second window pulses are produced while taking into consideration acceptable variations of the rise and decay times.

As far as the other elements of the circuits described are concerned, no further information or description should be required, because the circuits can readily be put together by a person skilled in the art while using conventional elements of the kind intended in the present context.

The phosphors employed in the above-described invention can be produced in accordance with the procedure described by Kano et al. in the Journal of the Electrochemical Society, Vol. 119, No. 11, pages 1561–1564 (1972).

While specific embodiments of the present invention have been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A checkable document, characterized in that it is provided with a marking comprising a material based upon rare earth metals, with the property that when excited by longer wave radiation it emits shorter wave radiation.

2. A document as claimed in claim 1, characterized in that said material is IR-excitable to emit visible light.

3. A document as claimed in claim 1, characterized in that said material is of the type $Na\ Ln\ F_4 : Yb^{3+}, Er^{3+}$ (Ln: Y, Gd, La).

4. A document as claimed in claim 1, characterized in that said material is of the type $Ln\ F_3 : Yb^{3+}, Er^{3+}$ (Ln: Y, La).

5. A document as claimed in claim 1, characterized in that the said material is applied in the form of a crystalline powder.

6. A document as claimed in claim 1, characterized in that the said material is applied in a predetermined pattern, especially in the form of a coded pattern of points or areas.

7. A document as claimed in claim 6, characterized in that said material is applied in a coded pattern of areas.

8. A method of marking and checking a document, the method comprising the steps of
   at the time of marking providing the document with a material based on rare earth metals, which has the property that when excited by longer wave radiation, it emits shorter wave radiation; and
   at the time of checking, irradiating at least parts of the document which are provided with said material by said longer wave radiation, and detecting the presence of consequent shorter wave radiation.

9. A method as claimed in claim 8, characterized in that said marking step includes applying said material in the form of a crystalline powder.

10. A method as claimed in claim 8, applied to a document produced by photographic techniques, characterized in that said marking step includes applying said material to the photographic emulsion.

11. A method as claimed in claim 8, characterized in that said marking step includes applying said material by applying a slurry thereof in a predetermined pattern using a screenprinting process.

12. A method as claimed in claim 8, characterized in that said checking stop includes irradiating the document by using IR radiation produced by at least one light emitting diode.

13. A method as claimed in claim 8, characterized in that said checking step includes irradiating in pulsed fashion and determining the rise and decay times of corresponding detected pulses of shorter wave radiation in order to check that the said shorter wave radiation originates from the correct material.

14. A method as claimed in claim 8, characterized in that said checking step includes irradiating the document in accordance with a predetermined pattern or areas; detecting from which areas shorter wave radiation produced by the radiation excitation is received; and comparing information about the areas thus obtained with information obtained from another source and pertaining to the areas from which shorter wave radiation should be received, when irradiated with longer wave radiation.

15. An apparatus for checking a document, which document is provided with a marking comprising a material based upon rare earth metals, having the property that when excited by longer wave radiation, it emits shorter wave radiation, the apparatus comprising means for placing the document and said radiation-generating and radiating-detecting means in a predetermined check position relatively to one another, a number of means for generating longer wave radiation for irradiation of said document; and a corresponding number of means for detecting shorter wave radiation emitted from said document as a consequense of said irradiation, each radiation- generating means being assigned to a specific radiation-detecting means.

16. An apparatus as claimed in claim 15, characterized in that each radiation-generating means includes an IR light emitting diode.

17. An apparatus as claimed in claim 15, characterized in that each radiation-generating means is arranged to emit the major part of its radiation energy within a limited wavelength range which is appropriate in view of the check material which said means is to excite.

18. An apparatus as claimed in claim 15, characterized in that each radiation-detecting means includes a photodiode.

19. An apparatus as claimed in claim 15, characterized in that each radiation-detecting means is arranged to detect radiation largely exclusively within a limited wavelength range determined by the shorter wave radiation which is to be received from the check material and which said means is to detect.

20. An apparatus as claimed in claim 15, characterized in that pulse control means are arranged to pulseoperate said radiation-generating means and first check means, said first check means being arranged also to receive check pulse corresponding to output pulses from said radiation-detecting means assigned to said radiation-generating means, and if control and check pulse influencies coincide, to produce a pulse.

21. An apparatus as claimed in claim 20, characterized by means for statically holding the document and said radiation-generating and radiation-detecting means in a predetermined check position relatively to one another, said pulse control means comprising an oscillator for supplying a pulse train to said radiation-generating means and to said first check means when the check position is achieved, said first check means being arranged to check, in respect of each pair of radiation-generating and radiation-detecting means, that the number of pulses received in the pulse train corresponds with the number of check pulses also received at the same time.

22. An apparatus as claimed in claim 21, characterized in that said first check means comprise a first counter for counting the pulses in the pulse train; a second counter for counting the check pulses; and comparator means for comparing the counts of the two counters.

23. An apparatus as claimed in claim 20, characterized by means which, with dynamically executed checking, control the document and said radiation-generating and radiation-detecting means in relation to one another, said pulse control means being arranged to produce a control pulse in respect of each check position.

24. An apparatus as claimed in claim 20, characterized in that second check means are arranged to check that the output pulses received from said radiation-detecting means have rise and decay times which fall within predetermined limits.

25. An apparatus as claimed in claim 24, characterized in that said second check means are arranged to pass check or control pulses to said first check means, only if the rise and decay times of the output pulses fall within the predetermined limits.

26. An apparatus as claimed in claim 24, characterized in that said second check means are arranged to inhibit corresponding pulses from said first check means, if the output pulses have rise and decay times which do not fall within the predetermined limits.

27. An apparatus as claimed in claim 15, for checking a document carrying markings in the form of a coded pattern of areas, characterized by means for comparing the result of the check on the areas in the pattern with check information concerning the areas, which has been obtained from a different source.

28. An apparatus as claimed in claim 27, characterized by means for the permanent storage of check information.

* * * * *